(12) United States Patent
Leonov et al.

(10) Patent No.: US 7,945,158 B2
(45) Date of Patent: May 17, 2011

(54) TRANSPONDER-LESS VERIFICATION OF THE CONFIGURATION OF AN OPTICAL NETWORK NODE

(75) Inventors: Oleg B. Leonov, Oak Park, IL (US); Stanley Chou, Naperville, IL (US)

(73) Assignee: Tellabs Operations, Inc., Naperville, IL (US)

( * ) Notice: Subject to any disclaimer, the term of this patent is extended or adjusted under 35 U.S.C. 154(b) by 688 days.

(21) Appl. No.: 11/505,972

(22) Filed: Aug. 18, 2006

(65) Prior Publication Data

US 2008/0044180 A1    Feb. 21, 2008

(51) Int. Cl.
H04B 10/08    (2006.01)
H04B 17/00    (2006.01)

(52) U.S. Cl. .......... 398/25; 398/9; 398/10; 398/13; 398/17; 398/22; 398/31; 398/33

(58) Field of Classification Search .......... 398/9–38
See application file for complete search history.

(56) References Cited

U.S. PATENT DOCUMENTS

| | | | |
|---|---|---|---|
| 5,005,175 A | 4/1991 | Desurvire et al. | |
| 5,027,079 A | 6/1991 | Desurvire et al. | |
| 5,117,196 A * | 5/1992 | Epworth et al. | 359/333 |
| 5,767,998 A * | 6/1998 | Hasegawa et al. | 398/80 |
| 5,801,879 A | 9/1998 | Burton et al. | |
| 5,862,250 A * | 1/1999 | Csipkes et al. | 382/141 |
| 5,878,071 A | 3/1999 | Delavaux | |
| 5,892,615 A | 4/1999 | Grubb et al. | |
| 5,900,968 A * | 5/1999 | Srivastava et al. | 359/341.41 |
| 5,930,418 A * | 7/1999 | Chang | 385/24 |
| 6,025,941 A * | 2/2000 | Srivastava et al. | 398/7 |
| 6,061,369 A | 5/2000 | Conradi | |
| 6,118,575 A | 9/2000 | Grubb et al. | |
| 6,175,436 B1 * | 1/2001 | Jackel | 359/349 |
| 6,181,465 B1 | 1/2001 | Grubb et al. | |
| 6,323,981 B1 * | 11/2001 | Jensen | 398/11 |
| 6,344,921 B1 * | 2/2002 | Galvanauskas et al. | 359/332 |
| 6,363,088 B1 * | 3/2002 | Alphonse et al. | 372/6 |
| 6,421,168 B1 * | 7/2002 | Allan et al. | 359/337 |
| 6,479,844 B2 | 11/2002 | Taylor | |
| 6,532,106 B2 | 3/2003 | Chung et al. | |
| 6,549,572 B1 * | 4/2003 | Anderson et al. | 375/225 |
| 6,559,946 B2 | 5/2003 | Davidson et al. | |
| 6,584,246 B1 * | 6/2003 | Michal et al. | 385/27 |
| 6,621,835 B1 * | 9/2003 | Fidric | 372/6 |
| 6,831,779 B2 | 12/2004 | Caplan | |
| 6,987,783 B2 | 1/2006 | Fajardo et al. | |
| 7,365,903 B2 * | 4/2008 | Choi et al. | 359/337.1 |
| 7,386,234 B2 * | 6/2008 | Lee et al. | 398/67 |
| 7,499,646 B2 * | 3/2009 | Emongkonchai | 398/2 |
| 7,522,839 B2 * | 4/2009 | Onaka et al. | 398/83 |
| 2001/0038472 A1 * | 11/2001 | Lee et al. | 359/110 |

(Continued)

*Primary Examiner* — Ken N Vanderpuye
*Assistant Examiner* — Tanya Ngo
(74) *Attorney, Agent, or Firm* — Fitzpatrick, Cella, Harper & Scinto

(57) ABSTRACT

A method, apparatus, and program, for evaluating an optical network node. The method comprises providing at least one communication path of the node with a capability by which lasing can occur in the communication path, and detecting whether lasing has been established in the communication path to determine whether the optical node is operational. If no lasing is detected in the detecting, a fault exists in the communication path. The method further comprises determining an insertion loss in the communication path, and determining whether the insertion loss is comparable to a predetermined insertion loss, to confirm whether the node is configured correctly.

10 Claims, 2 Drawing Sheets

U.S. PATENT DOCUMENTS

| | | | |
|---|---|---|---|
| 2001/0050804 A1* | 12/2001 | Chung et al. | 359/341.2 |
| 2002/0101636 A1* | 8/2002 | Xiao et al. | 359/127 |
| 2002/0131098 A1* | 9/2002 | Israel et al. | 359/110 |
| 2003/0160952 A1* | 8/2003 | Araki et al. | 356/73.1 |
| 2004/0052522 A1* | 3/2004 | Fishteyn et al. | 398/29 |
| 2004/0136641 A1* | 7/2004 | Campbell et al. | 385/15 |
| 2004/0218258 A1* | 11/2004 | Feldman et al. | 359/341.43 |
| 2004/0228628 A1* | 11/2004 | Richards et al. | 398/16 |
| 2005/0180748 A1* | 8/2005 | Kawahata | 398/16 |
| 2005/0213965 A1* | 9/2005 | Bergmann et al. | 398/16 |

* cited by examiner

TRANSPONDER-LESS VERIFICATION OF THE CONFIGURATION OF AN OPTICAL NETWORK NODE

BACKGROUND OF THE INVENTION

1. Field of the Invention

This invention relates to Optical Network Nodes (ONNs), and, in particular, to a method, apparatus, and program for verifying the operation and configuration of an ONN that includes at least one optical broad-band amplifier and a channel selective filter, using a lasing effect.

2. Description of Related Art

Modern Dense Wavelength Division Multiplexing (DWDM) optical networks, such as the Tellabs® 7100 Optical Transport System, include a significant number of optical channels. In such networks, optical fiber connections in every node must be verified to confirm that they are operational for every channel. Each network node typically also needs to be pre-configured, or "base-lined", for every channel prior to interconnecting any transponders.

It is becoming a more common practice to use broad-band Amplifier Spontaneous Emission (ASE) noise produced by optical amplifiers, that are a part of every node, in node configuration verification procedures and conducting baseline measurements. Such procedures typically are used in open loop systems.

However, optical network nodes typically include channel selective filters, such as ROADM, Wavelength Blocker, or DGEF modules that introduce access to every channel, and unfortunately, these filters typically can introduce significant optical losses. In addition, use of a large number of channels leaves only a very small fraction of the optical energy contained in the ASE noise in each channel bandwidth.

Because of the high optical losses in the filters and the large number of channels through which ASE noise energy must be divided, it often is necessary to generate very high ASE noise power (e.g., 20 dBm or greater) in the above prior art nodes, or to increase the complexity of per-channel optical power detectors, or both. Either case can be expensive and requires use of complex optical components such as power detectors, transponders and the like, despite the fact that the components might be used only once. There is a need, therefore, to provide an improved technique for performing node configuration verification procedures, that overcomes the foregoing deficiencies.

SUMMARY OF THE INVENTION

The foregoing and other problems are overcome by a method for evaluating a communication node, and also by a program and an apparatus, that operate in accordance with the method.

The method comprises providing at least one communication path of the node with a capability by which lasing can occur in the communication path, and then detecting whether lasing has been established in the communication path to determine whether the optical node is operational. If no lasing condition is detected in the detecting, a fault or other condition exists in the communication path rendering the node insufficiently operational. The method further comprises determining an insertion loss in the communication path (if lasing has been established), and determining whether the insertion loss is comparable to a predetermined insertion loss, to confirm whether the node is configured correctly.

Preferably, the providing includes optically coupling an output of the communication path back to an input of the communication path to form a closed path or cavity (e.g., a ring or loop) in which lasing can occur.

At least one filter preferably is interposed in the communication path, and the method further comprises operating the filter so that it passes only a single channel.

In accordance with a preferred embodiment of the invention, the detecting includes measuring power at the output of the communication path, and determining whether the power exceeds a predetermined threshold value.

Also in accordance with the preferred embodiment of the invention, plural optical amplifiers are interposed in the communication path between the input and output of the communication path. Moreover, the determining of the insertion loss preferably is performed by measuring an output power of at least a first one of the amplifiers, measuring an output power of at least a second one of the amplifiers that is interposed between the first amplifier and the output of the communication path, and determining a difference between results of the measurings. A determination that the insertion loss is comparable to the predetermined insertion loss indicates that the optical node is configured correctly and that there are no significant problems in the communication path. The measurings may be performed by, for example, photodetectors or other types of optical detectors.

According to one embodiment of the invention, the method further comprises reconfiguring the optical node if the insertion loss is determined to be not comparable to the predetermined insertion loss.

According to another aspect of the present invention, the method further comprises operating the amplifiers so that they compensate for predetermined losses in the communication path.

By providing a closed path to introduce lasing and employing filtering to limit the passage of optical energy to only a single channel, versus merely using ASE noise in an open loop configuration as in the prior art, the output power from the optical amplifiers used in the invention can be significantly less than that required in prior art devices. Less expensive optical amplifiers and per-channel optical detectors therefore can be employed, as compared to those used in prior art techniques.

BRIEF DESCRIPTION OF THE DRAWINGS

The present invention will be more readily understood from a detailed description of the preferred embodiment taken in conjunction with the following figures.

Identically labeled elements appearing in different ones of the figures refer to the same elements but may not be referenced in the description for all figures.

DETAILED DESCRIPTION OF THE PREFERRED EMBODIMENTS

Figure 1:
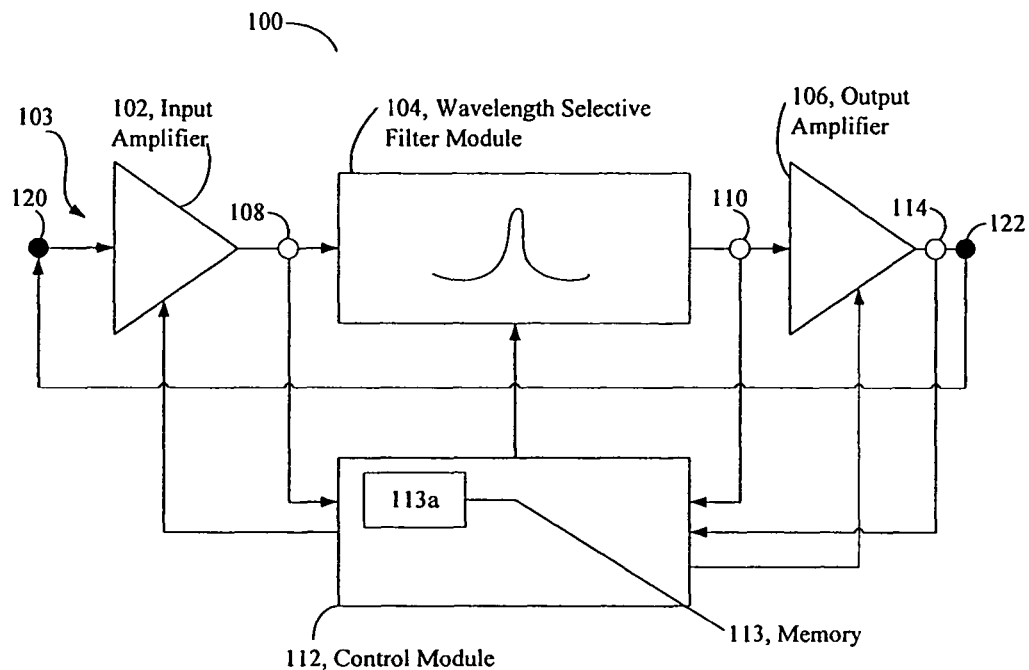
FIG. 1 is a block diagram of an Optical Network Node that is constructed in accordance with a preferred embodiment of this invention.

FIG. 1 is a block diagram of an Optical Network Node (ONN), also referred to herein as an optical communication node 100, that is constructed in accordance with a preferred embodiment of the invention. The node 100 has an input 120, an output 122, and a communication path 103 coupled between the input 120 and output 122. Interposed in the path 103 are at least one input amplifier 102, at least one wavelength selective filter module 104 having an input coupled to an output of the input amplifier 102, and an output amplifier 106 having an input coupled to an output of the module 104. Interposed in the portion of the communication path 103 between the output of the input amplifier 102 and the input of the module 104 is at least one device for measuring optical power in the path, such as, for example, a photodetector 108 or another suitable device for detecting the optical power in the path 103. Similarly, interposed in the portion of the communication path 103 between the output of the module 104 and the input of the output amplifier 106, also is at least one device for measuring optical power in that path, such as, for example, a photodetector 110. According to a preferred embodiment of the invention, another device for measuring optical power in the path 103 is interposed between the output of amplifier 106 and the node output 122, such as a photodetector 114. Of course, in other embodiments, other types of devices for detecting optical power or another type of energy (where applicable) may be employed in lieu of the photodetectors 108, 110, and 114.

The input amplifier 102 amplifies signals that are applied to the input 120 of the node 100, and outputs resultant amplified signals in the path 103 towards the module 104 via the photodetector 108. The output amplifier 106 amplifies signals received at the input thereof, and outputs resultant amplified signals to the output 122 of the node 100 via photodetector 114. Preferably, the amplifiers 102 and 106 are EDFA amplifiers, although in other embodiments other suitable types of amplifiers may be used instead.

The node 100 also comprises a control module 112 coupled to an output of the photodetectors 108, 110, and 114 for receiving information indicating respective optical powers detected by the photodetectors 108, 110, and 114 in their respective portions of the communication path 103. According to one embodiment of the invention, control module 112 also is coupled to the amplifiers 102 and 106 to control their respective gains and output powers.

Control module 112 also is coupled to the filter module 104. The module 104 is controllable by the control module 112 for selecting one or more predetermined channels, to enable signals of wavelength(s) falling within those channels, and received from the amplifier 102, to propagate to the output amplifier 106 through the filter module 104 and photodetector 110.

The control module 112 operates in accordance with software control programs and operating routines stored in an associated memory 113, which may be part of the module 112, as shown in FIG. 1, or which may be a separate component. In either case, the module 112 can write and/or read information to/from the memory 113. According to one embodiment of the invention, the module 112 operates under the control of the routines/programs having instructions 113a, stored in the memory 113, to control the amplifiers 102 and 106 and the filter module 104. The control module 112 also operates under the control of the routines/programs to perform at least part of a method of this invention for verifying the operation of the node 100. That method will be described below in conjunction with FIG. 3.

It should be noted that while only a single communication path 103 is shown in the node 100, the path actually can include one or more communication paths, although only one is shown for convenience. Similarly, the filter module 104 may include one or more filters (e.g., one or more for each path), depending on applicable design criteria, and there may be more than the number of the components 102, 104, 106, 108, 110, 106, 112, 113, and 114 in the node 100 than are shown in FIG. 1. In addition, the photodetectors 108, 110, and 114 may be interposed at other suitable locations within the communication path of the node 100 besides those shown in FIG. 1, depending on applicable design criteria.

Furthermore, it should be noted that the node 100 (and path 103) also may comprise other components besides, and/or in addition to, those shown FIG. 1, such as, for example, one or more WDM and/or DWDM multiplexers/demultiplexers, optical add/drop multiplexers/demultiplexers (OADMs), optical switches, variable optical attenuators (VOAs) and the like, depending on applicable design criteria, although for convenience, no such other components are shown in FIG. 1. Moreover, depending on applicable design criteria, the control module 112 may be located externally from the node 100, or within the node 100 itself as shown in FIG. 1, and the communication path 103 can be capable of communicating optical energy, electrical energy, or both.

Figure 2:
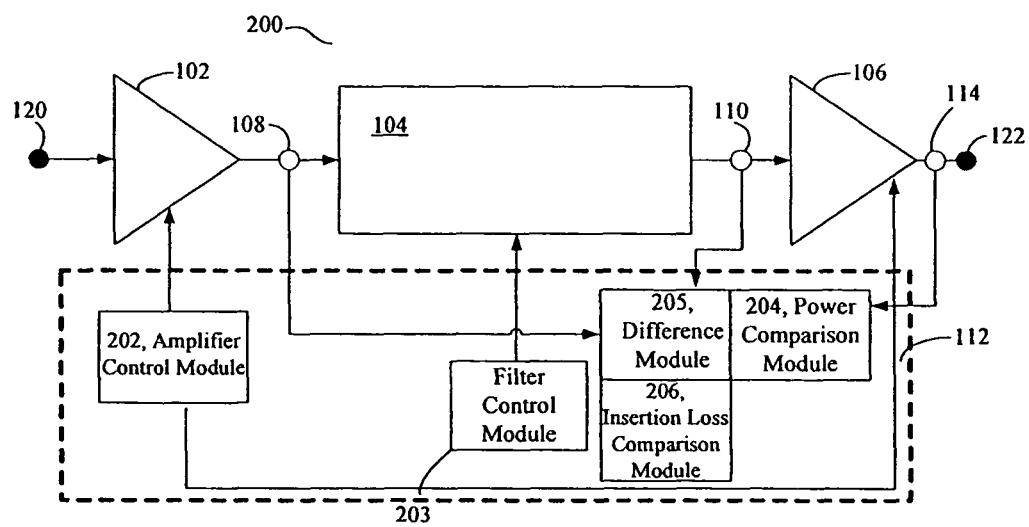
FIG. 2 illustrates a logical diagram of modules of an exemplary control module according to an embodiment of this invention.

FIG. 2 illustrates a logical diagram 200 of modules of an exemplary control module 112 (FIG. 1) or similarly organized circuit device (e.g., ASIC, PGA, FPGA, and the like) which can perform operations in accordance with the method of the present invention, and which are shown in FIG. 2 in association with components 102, 108, 104, 110, 106, 114, 120, and 122, described above. The modules may be implemented using hardcoded computational modules or other types of circuitry, or a combination of software and circuitry modules. In an exemplary embodiment, software routines for performing the modules depicted in logical diagram 200 can be stored as instructions 113a in memory 113 (FIG. 1) and can be executed by a processor of control module 112.

Figure 3:
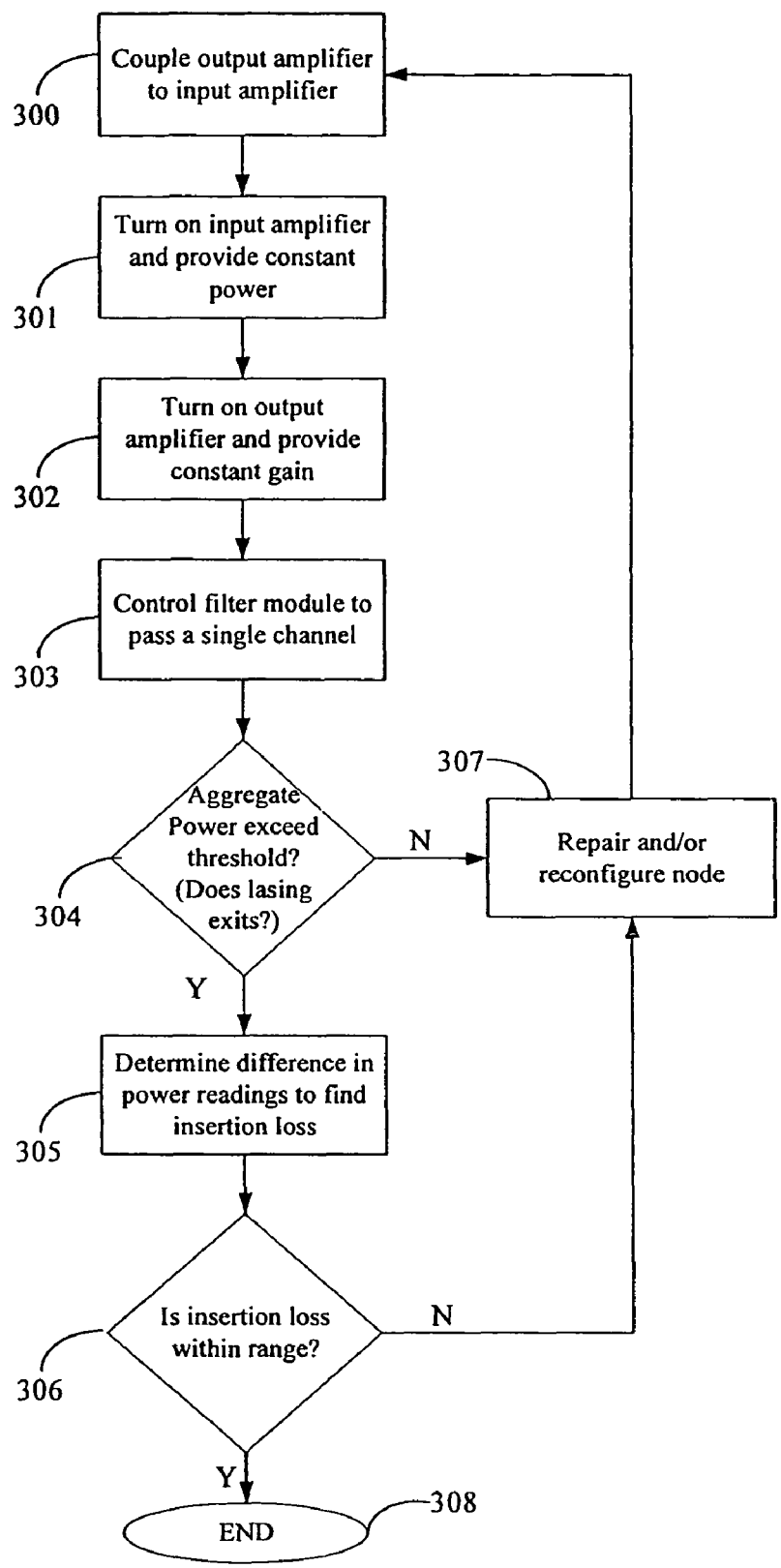
FIG. 3 is a flow diagram of a method performed in accordance with a preferred embodiment of this invention.

Logical diagram 200 includes an amplifier control module 202 which can control the amplifiers 102 and 106 in a manner to be described below in connection with blocks 301 and 301, respectively, of the flow diagram of FIG. 3, a filter control module 203 which can control the filter module 104 in a manner to be described below in connection with block 303 of FIG. 3, and a power comparison module 204 which can make a determination described below in connection with block 304 of FIG. 3. Diagram 200 also includes a difference module 205 that calculates a difference in power measurements to determine an insertion loss in a manner to be described below in connection with block 305 of FIG. 3, and an insertion loss comparison module 206 which performs a procedure described below in connection with block 306 of FIG. 3.

A method according to an aspect of the present invention will now be described. Briefly, the method involves providing the communication path 103 with a capability by which lasing can occur in the path 103. Preferably, this is accomplished by coupling the output of output amplifier 106 back to the input of the input amplifier 102 to establish a closed cavity through which optical energy, such as e.g., ASE noise, can continuously propagate. As is known in the art, lasing is a steady state condition that occurs when there is a closed cavity (such as, e.g., a loop or ring) in which light is propagated, and wherein the total loss in the cavity is less than the total gain in the cavity. According to the method of the invention, after the amplifier 106 output is coupled back to the input of amplifier 102, a determination is then made as to whether or not the node is operational and configured correctly, based on whether a lasing condition has been established and also based on an insertion loss in the path 103, respectively.

Preferably, the method is performed after the node 100 is manufactured but prior to the node 100 being employed (e.g., in a network) to handle traffic, although the method of the invention also can be performed at other times as well, whether the node 100 has handled traffic already or not.

The method will now be described in more detail with reference to FIG. 3. At block 300 the method is started and the output of amplifier 106 is coupled back to the input of the input amplifier 102 by, for example, coupling output 122 back to input 120. This may be accomplished by physically coupling at least one optical fiber from the output of the amplifier 106 to the input of amplifier 102, for example, although in other embodiments, other suitable manners of communicatively coupling the amplifier 106 output to the input of amplifier 102 may be employed instead. Also, the coupling may be performed manually or automatically using one or more optical switches (not shown), depending on applicable operating criteria.

At block 301 the input amplifier 102 is controlled so as to be placed in a constant output power mode and is powered on, so that while the amplifier 102 operates in that mode it provides a predetermined, substantially constant output power. The output amplifier 106 is controlled at block 302 so as to be placed in a constant gain mode and is powered on, so that while the amplifier 106 operates in that mode it provides a predetermined, substantially constant gain (such as, e.g., 23 dB or another predetermined value). In the foregoing blocks 301 and 302, the amplifiers 102 and 106, respectively, may be controlled by, for example, the control module 112 (module 202 of FIG. 2) to provide the respective predetermined output powers/gains, or may be controlled manually or otherwise, depending on applicable operating and/or design criteria. The specific manner in which the amplifier output power and/or gain is manipulated in each case can be in accordance with any suitable, known technique. Preferably, however, amplifiers 102 and 106 are controlled in blocks 301 and 302 so as to compensate for all optical losses in the communication path, such as, for example, predetermined (or otherwise expected) losses that are known to result from components included in the communication path 103 depicted in FIG. 1, and any other components that may be included in the path 103 but which are not shown (e.g., optical fibers, connectors, patch panels, filters etc.), and to enable lasing to occur in the path without causing damage to components resulting from excess power.

At block 303 the wavelength selective filter module 104 is controlled by the control module 112 (module 203 of FIG. 2) so as to be placed in a mode in which it passes wavelength(s) within only a single pre-selected channel, so that, when signals received from the amplifier 102 are applied to the input of the filter module 104, only those wavelength(s) within the pre-selected channel pass through the module 104 to the output amplifier 106. The powers of any such signals are measured by the photodetectors 108 and 110 as those signals propagate between the amplifier 102 and filter module 104, and between the module 104 and output amplifier 106, respectively. Similarly, the power of any signals outputted by the output amplifier 106 also is measured by the photodetector 114. Information indicative of the detected powers is provided by the respective photodetectors 108, 110, and 114 to the control module 112.

At block 304, the control module 112 (module 204 of FIG. 2) checks to determine whether a lasing condition exists in the communication path 103 of the node 100, based on at least one of the optical power readings. In particular, according to a preferred embodiment of the invention, the module 112 makes this determination by determining whether the aggregate optical power reading obtained by the photodetector 114 is greater than a predetermined threshold.

If the aggregate power is determined not to be greater than the predetermined threshold ("No" at block 304), meaning that no lasing condition exists in the node 100 (and thus no light is present), then a fiber and/or another component in the communication path 103 in the node 100 is deemed faulty. For example, a fault may be in the path 103 owing to an open condition preventing propagation of light, such as a break in a fiber or other component, an incorrect connection, and the like. Accordingly, the node 100 and its components may be physically examined and repaired as deemed necessary to correct the fault(s) (block 307), after which control passes back to block 300 where the node 100 then may be subjected to the procedure depicted in FIG. 3 again to confirm that the fault(s) have been successfully removed. Of course, the coupling in block 300 may or may not need to be performed again in such a case, depending on whether the output 122 and input 120 were de-coupled from each other during repair.

If the aggregate power is determined at block 304 to be greater than the predetermined threshold ("Yes" at block 304), then a lasing condition is confirmed to exist in which substantially all ASE noise is generated in the pre-selected channel. Accordingly, a determination of "Yes" at block 304 indicates that the communication path including fibers and other components, are operational.

Control then passes to block 305 where the module 112 (module 205 of FIG. 2) calculates a difference between aggregate power readings obtained by the photodetectors 108 and 110. The value of the calculated difference represents the insertion loss (e.g., the difference between the power at the input of output amplifier 106 and the power at the output of input amplifier 102) within the wavelength selective filter module 114 (and/or the portion of path 103 between components 108 and 110) for the pre-selected channel, and is compared by the module 112 (module 206 of FIG. 2) to a predetermined insertion loss value (e.g., a specification value) at block 306 to determine whether the calculated value is within a predetermined range of the predetermined insertion loss value. If the calculated value is within the predetermined range ("Yes" at block 306), then the node 100 is verified to be configured correctly and is therefore ready to handle traffic (e.g., in a network). The process therefore ends (block 308), although in other embodiments control may pass back to block 300, 301, 302, or 303 where the process described above may be performed again beginning from that block for a next selected channel. Indeed, the process may be performed in a similar manner for each individual channel until all channels are evaluated in the above manner, depending on applicable operating criteria. In other embodiments, the process of FIG. 3 may be continued or performed originally for two or more pre-selected channels at the same time, in which case the filtering at block 303 would be performed to pass those channels.

Referring again to block 306, if the value calculated previously in block 305 is not within the predetermined range ("No" at block 306), then the node 100 is deemed to be not configured correctly and control passes back to block 307 where the node 100 is examined and repaired/reconfigured as deemed necessary to ensure its correct configuration. As an example, a determination of "No" at block 306 can be a result of a condition causing an insufficient propagation of light in the path 103, such as the presence of unwanted debris in the path, a crimp or other damage in a fiber and/or another component in the path, a deficient coupling between components in the path, and the like.

As described above, the present invention provides a novel technique for verifying whether an optical node is properly operational and configured correctly. By connecting the output 122 of the communication node 100 (and path 103) to its input 120, setting optical amplifiers in the node to compensate for all optical losses in components (e.g., optical filters, fibers, connectors and patch-panels, and the like) in the communication path 103, and setting the filter module 104 so that it passes only a single channel, lasing at the wavelength of this channel can occur, in which almost all ASE noise can be generated within the bandwidth of this channel. Because almost all ASE noise is generated within a single channel bandwidth, substantially no division of the ASE noise energy takes place as is required in prior art broadband devices in which ASE noise is used in plural channels. As such, the output power from the optical amplifiers required to perform the verification is significantly less (e.g., 10 to 20 dBm) than that required in such prior art devices. Less expensive optical amplifiers and per-channel optical detectors can therefore be employed in the invention, as compared to those used in prior art devices.

In the foregoing description, the invention is described with reference to a specific example embodiment thereof. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

Software embodiments of the present invention may be provided as a computer program product, or software, that may include an article of manufacture on a machine accessible or machine readable medium (memory) having instructions (see, e.g., FIG. 1). The instructions on the machine accessible or machine readable medium may be used to program a computer system or other electronic device. The machine-readable medium may include, but is not limited to, floppy diskettes, optical disks, CD-ROMs, and magneto-optical disks or other types of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While the invention has been particularly shown and described with respect to a preferred embodiment thereof, it should be understood that the embodiment has been presented by way of example, and not limitation. It will be apparent to persons skilled in the relevant art(s) that various changes in form and detail can be made therein without departing from the spirit and scope of the present invention. Thus, the present invention should not be limited by any above-described exemplary embodiment, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for evaluating an optical node, the method comprising:
   providing at least one open loop communication path of the node with a capability by which lasing can occur in the communication path by closing the open loop;
   generating amplifier spontaneous emission noise in the communication path at a level that establishes lasing in a closed loop portion of the communications path communicating the noise;
   operating a wavelength selective filter module to selectively pass, one at a time in the communication path, individual ones of a plurality of available selectable channels, until each separate channel has been passed in the communication; and
   for each channel passed in the communication path, detecting whether lasing has been established by determining whether an aggregate power at an output of the communication path exceeds a predetermined threshold value, to determine whether the optical node is operational, wherein the optical node is determined to be operational, rather than in a failure condition, when the aggregate power is determined to exceed the predetermined threshold value, thereby confirming that lasing has been established,
   determining an insertion loss by determining a difference between a first aggregate power at a first part of the communication path and a second aggregate power at a second part of the communication path, and
   automatically determining whether the insertion loss is within a predetermined range of a predetermined insertion loss.

2. A method as set forth in claim 1, wherein if no lasing is detected in the detecting, a fault exists in the communication path.

3. A method as set forth in claim 1, wherein the operating establishes lasing in selected ones of the channels.

4. A method as set forth in claim 1, wherein the wavelength selective filter module is interposed in the communication path.

5. A method as set forth in claim 1, wherein the providing includes optically coupling an output of the communication path back to an input of the communication path.

6. A method as set forth in claim 1, wherein the detecting further includes:
   measuring the aggregate power at the output of the communication path.

7. A method as set forth in claim 1, wherein plural optical amplifiers are interposed in the communication path between an input and an output of the communication path, and wherein the first part of the communication path is an output of a first one of the amplifiers, and wherein the second part of the communication path is an output of at least a second one of the amplifiers that is interposed between the first amplifier and the output of the communication path.

8. A method as set forth in claim 1, wherein a determination that the insertion loss is within the predetermined range indicates that the optical node is configured correctly.

9. A method as set forth in claim 1, further comprising reconfiguring the optical node if the insertion loss is determined not to be within the predetermined range.

10. A method as set forth in claim 1, wherein plural optical amplifiers are interposed in the communication path, and wherein the method further comprises operating the amplifiers so that they compensate for predetermined losses in the communication path.

* * * * *

UNITED STATES PATENT AND TRADEMARK OFFICE
CERTIFICATE OF CORRECTION

| | | |
|---|---|---|
| PATENT NO. | : 7,945,158 B2 | |
| APPLICATION NO. | : 11/505972 | |
| DATED | : May 17, 2011 | |
| INVENTOR(S) | : Oleg B. Leonov et al. | |

It is certified that error appears in the above-identified patent and that said Letters Patent is hereby corrected as shown below:

COLUMN 4:

Line 34, "blocks 301 and 301," should read --blocks 301 and 302,--.

Signed and Sealed this
Sixth Day of December, 2011

David J. Kappos
*Director of the United States Patent and Trademark Office*